United States Patent [19]

Fukuda

[11] Patent Number: 4,810,075

[45] Date of Patent: Mar. 7, 1989

[54] PROJECTION SYSTEM WITH A CATHODE RAY TUBE AND A LENS

[75] Inventor: Kyohei Fukuda, Fujisawa, Japan

[73] Assignee: Hitachi, Ltd., Tokyo, Japan

[21] Appl. No.: 715,950

[22] Filed: Mar. 25, 1985

[30] Foreign Application Priority Data

Mar. 26, 1984 [JP] Japan ................................. 59-56061
Mar. 26, 1984 [JP] Japan ................................. 59-56062

[51] Int. Cl.$^4$ .................... G02B 13/18; G02B 9/12; G02B 9/34; G03B 21/28

[52] U.S. Cl. ................................. 350/432; 350/412; 350/450; 350/473; 350/477; 353/50; 353/67; 353/77

[58] Field of Search ................. 350/412, 432–435, 350/450, 473, 477; 353/47, 50, 67, 74, 76, 77, 78

[56] References Cited

U.S. PATENT DOCUMENTS

| | | | |
|---|---|---|---|
| 2,552,672 | 5/1951 | Grey | 350/432 |
| 2,638,034 | 5/1953 | Wreathall | 350/432 |
| 4,300,817 | 11/1981 | Betensky | 350/412 |
| 4,348,081 | 9/1982 | Betensky | 350/412 |
| 4,526,442 | 7/1985 | Betensky | 350/412 |
| 4,577,935 | 3/1986 | Yamakawa et al. | 350/412 X |

Primary Examiner—John K. Corbin
Assistant Examiner—Scott J. Sugarman
Attorney, Agent, or Firm—Antonelli, Terry & Wands

[57] ABSTRACT

A projection system comprising from the image end a screen, a lens in which a core portion including the lens axis accomplishes a convergence function and in which a peripheral portion including a lens edge thereof accomplishes the divergence function, a convex lens element, a concave lens element and a CRT having a face glass whose inner surface is coated with a phosphor and is so curved to form a fourth lens element with a curvature center within a core portion including the lens axis is disposed on the screen side of the projection system, the curvature radius of each part of the core portion of the fourth lens increasing thereof in accordance with increments of the semi-aperture distance of each part from the lens axis.

42 Claims, 4 Drawing Sheets

PROJECTION SYSTEM WITH A CATHODE RAY TUBE AND A LENS

FIELD OF THE INVENTION

This invention relates to a projection system adapted to project an enlargement of an image appearing on a cathode ray tube (CRT).

BACKGROUND OF THE INVENTION

U.S. Pat. No. 4,348,081 discloses a projection system with a high brightness by using lenses having aspheric surfaces. However, the length of the light beam progress path from the face glass of the CRT to a screen in the disclosed projection system is so long that it is not suitable for a compact projection set. In general, if a lens consists of a glass material, it produces a spherical aberration rather than a color aberration, and if it consists of a plastic material, it produces color aberration rather than spherical aberration. Since the lens in the disclosed projection system in U.S. Pat. No. 4,348,081 is aspherical, it consists of the plastic material and therefore color aberration is present. Color aberration is increased in accordance with the light beam progress path, and the color aberration is increased in the disclosed projection system.

The relationship between the focus distortion by thermal variation and the focal length or the relationship between the color aberration and the focal length are as follows. Assuming that the thickness of the lens is negligible in FIG. 1, the following equations are obtained.

$$1/a + 1/b = 1/f \quad (1)$$

$$1/f = (N-1)(1/r_1 - 1/r_2) \quad (2)$$

where
- a is the distance between lens 1 and the phosphor surface of CRT 2,
- b is the distance between lens 1 and screen 3,
- f is the focal length of lens 1,
- $r_1$ and $r_2$ are curvature radii of lens 1.
- N is the refractive index.

Since the characteristics of the projection system is affected less by the fluctuation for the curvature radius, which is caused by the fluctuation of the lens shape caused by the thermal fluctuation, than the refluctuation for the refractive index which is caused by the fluctuation of the lens shape, and since fluctuation caused by curvature radius may be cancelled with the fluctuation for the lens barrel if they consist of plastic materials, equation (3) is obtained from equation (2) by neglecting the terms including $r_1$ and $r_1$.

$$\delta f/f = \delta N/(N-1) \quad (3)$$

Deviation δ d for the diameter d of the beam spot projected on screen 3 is defined by following equation (4).

$$\delta d = \delta b \cdot \alpha = \delta b/(F \cdot M) \quad (4)$$

where
- F is the F number of lens 1,
- M is the magnification of lens 1,
- α is the common elevation angle for both the beam spot and lens 1.

From equation (1)–(4)

$$d = ((1+M)^2 \cdot f/(F \cdot M)) \cdot (\delta N/(N-1)) \quad (5)$$

As appearing equation (5), d is proportioned to focal length f, therefore the aberration corresponding to diameter d of the beam spot is reduced if flocal length f is shortened.

SUMMARY OF THE INVENTION

An object of the invention is to provide a projection system with a light beam progress path of reduced length.

In accordance with the invention, there is provided from the image end a screen, a first lens in which a core portion including the lens axis accomplishes a convergence function and in which a peripheral portion including a lens edge thereof accomplishes the divergence function, a second lens comprising a convex lens surface, a third lens comprising a concave lens surface, and a CRT having a face glass with an inner surface which is coated with a phosphor and being curved to form a fourth lens element with a curvature center within a core portion including the lens axis of the fourth lens that is disposed on the screen side of the projection system, the curvature radius of each part of the core portion of the fourth lens increasing in accordance with increments of the semi-aperture distance of each part from the lens axis.

DESCRIPTION OF THE PREFERRED EMBODIMENTS

It is necessary to enlarge the picture angle of lens 1 for shortening focal length f without changes of magnification M and the brightness. According to the embodiment of this invention, the focal length f is shortened by 35% from that in the projection system which is trial manufactured from the data disclosed in said U.S. Pat. No. 4,348,081. Though the picture angle of the projection system in U.S. Pat. No. 4,348,081 is almost 50 degrees, that of this embodiment is almost 70 degrees.

Figure 1:
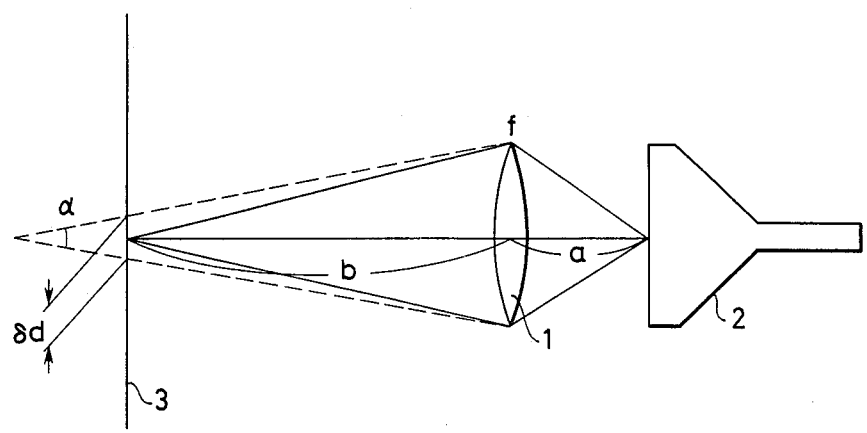
FIG. 1 shows a side elevation of a general basic projection system.
Figure 2:
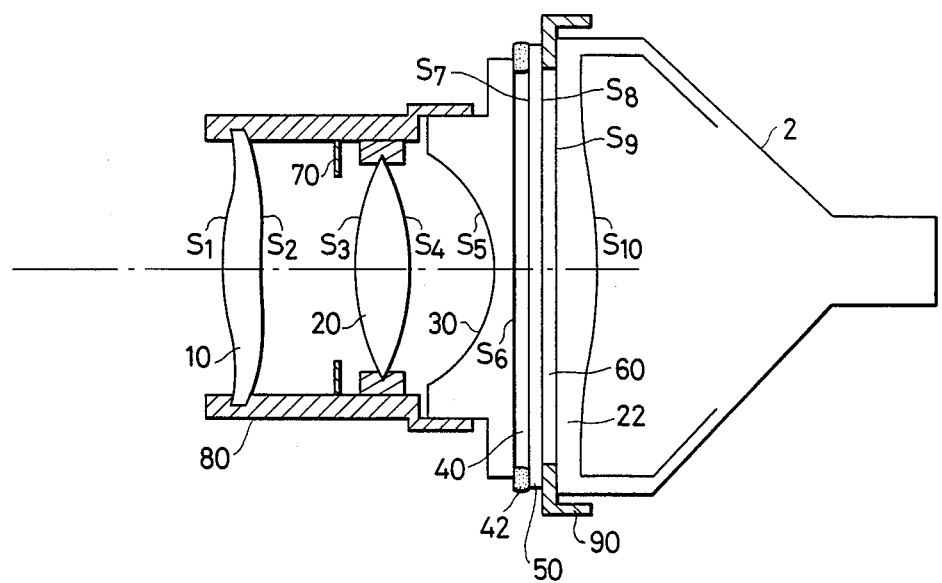
FIG. 2 shows a side elevation of one embodiment of the invention.
Figure 3:
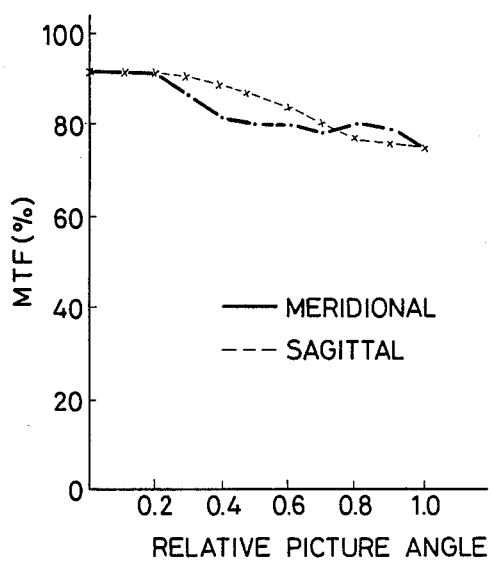
FIGS. 3–9 show characteristics of the embodiment shown in FIG. 2.
Figure 4:
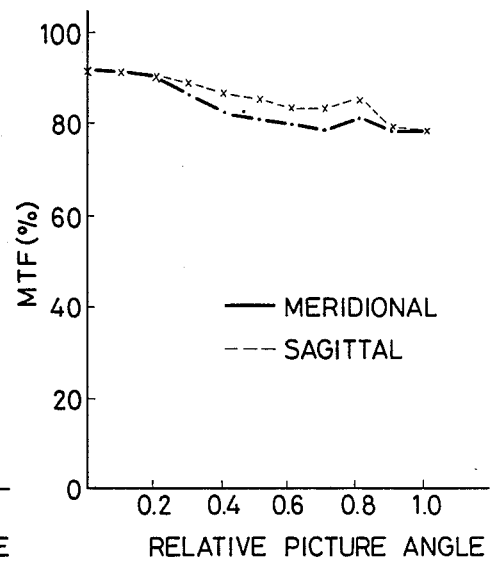
Figure 5:
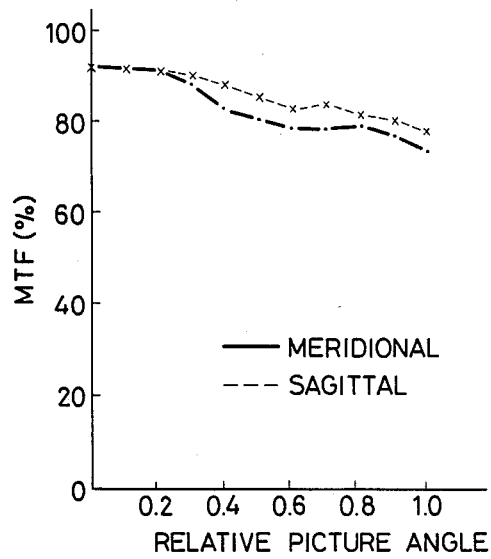
Figure 6:
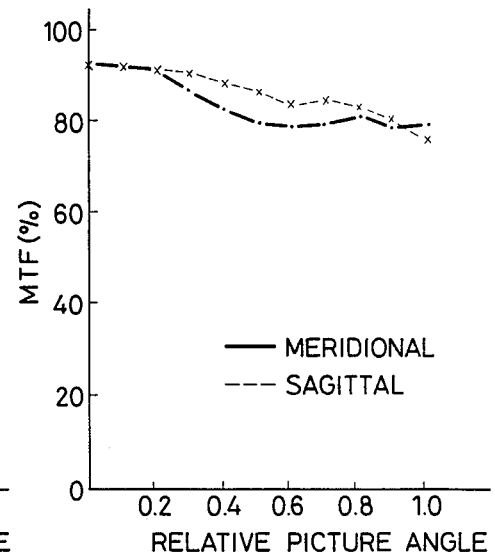
Figure 7:
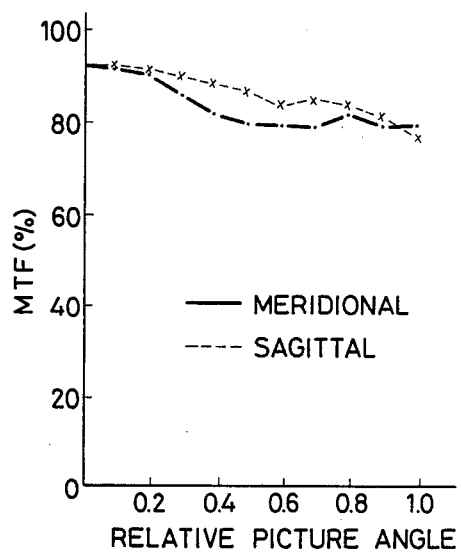

In FIG. 2, numeral 10 denotes a lens element having surface S1 opposed to screen 3, in which a core portion 10' including the lens axis thereof accomplishes a convergence function and in which a peripheral portion 10" including a lens edge thereof accomplishes a divergence function; numeral 20 denotes a bi-convex lens element having surface S3 opposed to surface S2 of lens element 10; numeral 30 denotes a concave lens element having surface S5 opposed to surface S4 of lens element 20; numeral 40 denotes a liquid layer comprising a silican gel disposed between surface S6 of lens element 30 and surface S7 of shield glass 50 which is sealed by sealing material 42; numeral 60 denotes a cooling liquid filled between surface S8 and surface S9 of face glass 22 of CRT 2; numeral 70 denotes a diaphragm; numeral 80 denotes a lens barrel for supporting lenses 10 and 20, and diaphragm 70; and numeral 90 denotes a heat radiator. In this embodiment, lenses 10, 20 and 30 consist of plastic material.

Concerning the face glass 22, although surface S9 is plano, surface S10 on which a phosphor layer is coated is curved to cause face glass 22 to function as a lens. The curvature center 11 for the core portion 11' of surface S10 is disposed on the screen side of the projection system, and the curvature radius of each part of the core portion is increased in accordance with an increment of the semi-aperture distance of each part from the lens axis to reduce field curvature. Diaphragm 70 is used to reduce the aberration and to increase the brightness in the peripheral portion of the lens system.

Tables 1–5 shows lens data of 5 typical examples for the embodiment as shown in FIG. 2, respectively. In each table, the longitude dimension is "mm". The surface S10 is symmetrical with respect to the curvature center 11 which lies on the optical axis 11″ of the system. Each point on the core portion 11' has a curvature radius which is a function of the radius of that point from the curvature center 11 with points located farthest from the curvature center having the greatest curvature radius. As is known, the curvature radius of a point is the length of the radius from the optical axis which intersects the point orthogonally on the surface S10.

TABLE 1

| | | \multicolumn{4}{c}{spherical system} | | | |
|---|---|---|---|---|---|
| | | curvature radius | aperture radius | gap between surfaces | N |
| screen | | infinity | 650 | — | — |
| air | | — | — | 819 | 1.0 |
| | S1 | 69.9918 | 41 | — | — |
| lens 10 | | | | 15.348 | 1.4936 |
| | S2 | 1321.65 | 40 | — | — |
| air | | | | 28.68 | 1.0 |
| diaphragm | | infinity | 34 | — | — |
| air | | — | — | −3.936 | 1.0 |
| | S3 | 71.9865 | 37 | — | — |
| lens 20 | | | | 22.5 | 1.4936 |
| | S4 | −97.0798 | 37 | — | — |
| air | | — | — | 29.38 | 1.0 |
| | S5 | −51.7639 | 34 | — | — |
| lens 30 | | | | 1.97 | 1.4936 |
| | S6 | infinity | 65 | — | — |
| layer 40 | | | | 3.0 | 1.41 |
| | S7 | infinity | 65 | — | — |
| glass 50 | | | | 5.0 | 1.5403 |
| | S8 | infinity | 65 | — | — |
| layer 60 | | | | 5.0 | 1.41 |
| | S9 | infinity | 65 | — | — |
| glass 22 | | | | 12.5 | 1.5403 |
| | S10 | −119.63 | 65 | — | — |

| | \multicolumn{5}{c}{aspheric coefficency} | | | | |
|---|---|---|---|---|---|
| | CC | AD | AE | AF | AG |
| S1 | −1.8 | −1.0048 $*10^{-6}$ | −3.8854 $*10^{-10}$ | −6.1692 $*10^{-13}$ | 1.3487 $*10^{-16}$ |
| S2 | −11422.8 | −8.5072 $*10^{-7}$ | −7.2955 $*10^{-10}$ | −1.9378 $*10^{-14}$ | 1.8982 $*10^{-17}$ |
| S3 | 0.706 | −8.2494 $*10^{-7}$ | 2.0845 $*10^{-9}$ | −1.8454 $*10^{-12}$ | 7.6402 $*10^{-16}$ |
| S4 | −8.4248 | −3.7132 $*10^{-7}$ | 1.2314 $*10^{-10}$ | −5.0054 $*10^{-14}$ | 1.6347 $*10^{-16}$ |
| S5 | −0.1266 | −4.8809 $*10^{-6}$ | −2.9551 $*10^{-9}$ | 2.441772 $*10^{-12}$ | −1.7595 $*10^{-15}$ |
| S10 | −3.0554 | 8.4036 $*10^{-7}$ | 8.036 $*10^{-11}$ | −6.4008 $*10^{-14}$ | 6.4367 $*10^{-18}$ |

TABLE 2

| | | \multicolumn{4}{c}{spherical system} | | | |
|---|---|---|---|---|---|
| | | curvature radius | aperture radius | gap between surfaces | N |
| screen | | infinity | 650 | — | — |
| air | | — | — | 819 | 1.0 |
| | S1 | 71.2596 | 41 | — | — |
| lens 10 | | | | 14.968 | 1.4936 |
| | S2 | 1764.882 | 40 | — | — |
| air | | | | 28.68 | 1.0 |
| diaphragm | | infinity | 34 | — | — |
| air | | — | — | −2.843 | 1.0 |
| | S3 | 74.14 | 37 | — | — |
| lens 20 | | | | 20.5 | 1.4936 |
| | S4 | −96.279 | 37 | — | — |
| air | | — | — | 30.65 | 1.0 |
| | S5 | −54.432 | 34 | — | — |
| lens 30 | | | | 1.97 | 1.4936 |
| | S6 | infinity | 65 | — | — |
| layer 40 | | | | 3.0 | 1.41 |
| | S7 | infinity | 65 | — | — |
| glass 50 | | | | 5.0 | 1.5403 |
| | S8 | infinity | 65 | — | — |
| layer 60 | | | | 5.0 | 1.41 |
| | S9 | infinity | 65 | — | — |
| glass 22 | | | | 12.5 | 1.5403 |
| | S10 | −119.63 | 65 | — | — |

| | \multicolumn{5}{c}{aspheric coefficency} | | | | |
|---|---|---|---|---|---|
| | CC | AD | AE | AF | AG |
| S1 | −1.9171 | −1.02 $*10^{-6}$ | −3.7916 $*10^{-10}$ | −6.1651 $*10^{-13}$ | 1.3506 $*10^{-16}$ |
| S2 | −53575.5 | −8.451 $*10^{-7}$ | −7.185 $*10^{10}$ | −1.956 $*10^{-14}$ | 1.6043 $*10^{-17}$ |
| S3 | 0.6733 | −8.302 $*10^{-7}$ | 2.103 $*10^{-9}$ | −1.8471 $*10^{-12}$ | 7.3673 $*10^{-16}$ |
| S4 | −7.4915 | −3.9955 $*10^{-7}$ | 1.2045 $*10^{-10}$ | −6.7691 $*10^{-14}$ | 1.4311 $*10^{-16}$ |
| S5 | −0.08958 | −4.92989 $*10^{-6}$ | −3.11 $*10^{-9}$ | 2.2378 $*10^{-12}$ | −1.4784 $*10^{-15}$ |
| S10 | −3.0554 | 8.4036 $*10^{-7}$ | 8.036 $*10^{-11}$ | −6.4008 $*10^{-14}$ | 6.4367 $*10^{-18}$ |

TABLE 3

| | | \multicolumn{4}{c}{spherical system} | | | |
|---|---|---|---|---|---|
| | | curvature radius | aperture radius | gap between surfaces | N |
| screen | | infinity | 650 | — | — |
| air | | — | — | 819 | 1.0 |
| | S1 | 72.0293 | 41 | — | — |
| lens 10 | | | | 13.764 | 1.4936 |
| | S2 | 787.6048 | 40 | — | — |
| air | | | | 28.68 | 1.0 |
| diaphragm | | infinity | 34 | — | — |
| air | | — | — | −2.9396 | 1.0 |
| | S3 | 71.6792 | 37 | — | — |
| lens 20 | | | | 22.5 | 1.4936 |
| | S4 | −94.2325 | 37 | — | — |
| air | | — | — | 31.38 | 1.0 |
| | S5 | −52.9143 | 34 | — | — |
| lens 30 | | | | 1.97 | 1.4936 |
| | S6 | infinity | 65 | — | — |
| layer 40 | | | | 3.0 | 1.41 |
| | S7 | infinity | 65 | — | — |
| glass 50 | | | | 5.0 | 1.5403 |
| | S8 | infinity | 65 | — | — |
| layer 60 | | | | 5.0 | 1.41 |
| | S9 | infinity | 65 | — | — |
| glass 22 | | | | 12.5 | 1.5403 |
| | S10 | −119.63 | 65 | — | — |

| | \multicolumn{5}{c}{aspheric coefficency} | | | | |
|---|---|---|---|---|---|
| | CC | AD | AE | AF | AG |
| S1 | −2.14273 | −1.0977 $*10^{-6}$ | −4.2791 $*10^{-10}$ | −6.2481 $*10^{-13}$ | 1.3913 $*10^{-16}$ |
| S2 | −2231.044 | −8.9896 $*10^{-7}$ | −7.5804 $*10^{10}$ | −2.8993 $*10^{-14}$ | 1.7578 $*10^{-17}$ |
| S3 | 0.5655 | −9.2461 $*10^{7}$ | 2.1186 $*10^{-9}$ | −1.8462 $*10^{-12}$ | 7.0346 $*10^{-16}$ |
| S4 | −8.4915 | −4.016 | 6.2255 | −9.5483 | 1.7222 |

TABLE 3-continued

|    | *10^-7 | *10^-11 | *10^-14 | *10^-16 |
|----|--------|---------|---------|---------|
| S5 | −0.19658 | −4.7511 *10^-6 | −3.0027 *10^-9 | 2.268 *10^-12 | −1.3932 *10^-15 |
| S10 | −3.0554 | 8.4036 *10^-7 | 8.036 *10^-11 | −6.4008 *10^-14 | 6.4367 *10^-18 |

TABLE 4 spherical system

|  |  | curvature radius | aperture radius | gap between surfaces | N |
|--|--|------|------|------|------|
| screen |  | infinity | 650 | — | — |
| air |  | — | — | 819 | 1.0 |
|  | S1 | 70.9496 | 41 | — | — |
| lens 10 |  |  |  | 14.63 | 1.4936 |
|  | S2 | 1107.02 | 40 | — | — |
| air |  | — | — | 28.68 | 1.0 |
| diaphragm |  | infinity | 34 | — | — |
| air |  | — | — | −3.473 | 1.0 |
|  | S3 | 72.222 | 37 | — | — |
| lens 20 |  |  |  | 22.5 | 1.4936 |
|  | S4 | −95.489 | 37 | — | — |
| air |  | — | — | 30.157 | 1.0 |
|  | S5 | −52.270 | 34 | — | — |
| lens 30 |  |  |  | 1.97 | 1.4936 |
|  | S6 | infinity | 65 | — | — |
| layer 40 |  |  |  | 3.0 | 1.41 |
|  | S7 | infinity | 65 | — | — |
| glass 50 |  |  |  | 5.0 | 1.5403 |
|  | S8 | infinity | 65 | — | — |
| layer 60 |  |  |  | 5.0 | 1.41 |
|  | S9 | infinity | 65 | — | — |
| glass 22 |  |  |  | 12.5 | 1.5403 |
|  | S10 | −119.63 | 65 | — | — | aspheric coefficency

| | CC | AD | AE | AF | AG |
|--|------|-----|-----|-----|-----|
| S1 | −1.9538 | −1.0394 *10^-6 | −3.9561 *10^-10 | −6.1818 *10^-13 | 1.3579 *10^-16 |
| S2 | −6765.97 | −8.5949 *10^-7 | 7.3452 *10^10 | −2.3077 *10^-14 | 1.7486 *10^-17 |
| S3 | 0.6569 | −8.5919 *10^-7 | 2.1075 *10^-9 | −1.8443 *10^-12 | 7.3579 *10^-16 |
| S4 | −8.2290 | −3.8532 *10^-7 | 1.0584 *10^-10 | −6.7188 *10^-14 | 1.6440 *10^-16 |
| S5 | −0.1650 | −4.8377 *10^-6 | −2.9381 *10^-9 | 2.3241 *10^-12 | −1.6001 *10^-15 |
| S10 | −3.0554 | 8.4036 *10^-7 | 8.036 *10^-11 | −6.4008 *10^-14 | 6.4367 *10^-18 |

TABLE 5 spherical system

|  |  | curvature radius | aperture radius | gap between surfaces | N |
|--|--|------|------|------|------|
| screen |  | infinity | 650 | — | — |
| air |  | — | — | 819 | 1.0 |
|  | S1 | 70.8929 | 41 | — | — |
| lens 10 |  |  |  | 14.764 | 1.4936 |
|  | S2 | 1344.70 | 40 | — | — |
| air |  | — | — | 28.68 | 1.0 |
| diaphragm |  | infinity | 34 | — | — |
| air |  | — | — | −3.591 | 1.0 |
|  | S3 | 73.128 | 37 | — | — |
| lens 20 |  |  |  | 22.5 | 1.4936 |
|  | S4 | −95.217 | 37 | — | — |
| air |  | — | — | 29.876 | 1.0 |
|  | S5 | −52.509 | 34 | — | — |
| lens 30 |  |  |  | 1.97 | 1.4936 |
|  | S6 | infinity | 65 | — | — |
| layer 40 |  |  |  | 3.0 | 1.41 |
|  | S7 | infinity | 65 | — | — |
| glass 50 |  |  |  | 5.0 | 1.5403 |
|  | S8 | infinity | 65 | — | — |
| layer 60 |  |  |  | 5.0 | 1.41 |
|  | S9 | infinity | 65 | — | — |
| glass 22 |  |  |  | 12.5 | 1.5403 |
|  | S10 | −119.63 | 65 | — | — | aspheric coefficency

| | CC | AD | AE | AF | AG |
|--|------|-----|-----|-----|-----|
| S1 | −1.9294 | −1.0254 *10^-6 | −3.8279 *10^-10 | −6.1606 *10^-13 | 1.3589 *10^-16 |
| S2 | −16710.2 | −8.47 *10^-7 | −7.2228 *10^10 | −2.0155 *10^-14 | 1.6740 *10^-17 |
| S3 | 0.6876 | −8.2913 *10^-7 | 2.1159 *10^-9 | −1.8364 *10^-12 | 7.3846 *10^-16 |
| S4 | −7.8870 | −3.8067 *10^-7 | 1.2746 *10^-10 | −5.84 *10^-14 | 1.6748 *10^-16 |
| S5 | −0.1521 | −4.8868 *10^-6 | −2.8750 *10^-9 | 2.3051 *10^-12 | −1.6748 *10^-15 |
| S10 | −3.0554 | 8.4036 *10^-7 | 8.036 *10^-11 | −6.4008 *10^-14 | 6.4367 *10^-18 |

In each above tables aspheric coefficients are defined by the following equation.

$$Z = \frac{r^2/RD}{1 + \sqrt{1 - (1 + CC) r^2/RD^2}} + AD * r^4 + AE * r^6 + AF * r^8 + AG * r^{10}$$

where
Z is the surface sag at a semi-aperture distance r from the lens axis,
RD is the curvature radius of the lens,
CC is a conic constant or other surfaces of revolution.
Following conditions are obtained from above Tables in the case of 10 times enlarging by using a 4.5 inch CRT as CRT 2 and a 45 inch screen as screen 3.

$$0.9 r1 < r2 < 1.1 r1 \tag{1}$$

where r1 and r2 are curvature radii of the core portions of the screen-side surface of lens 10 and 20, respectively, assuming that said portions of spherical.

$$0.2 fS < T12 < 0.4 fs \tag{2}$$

where
T12 is the distance between lens 10 and lens 20,
fS is the focal length of all lens systems.

$$0.35 fS < T23 < 0.45 fS \tag{3}$$

where
T23 is the distance between lens 20 and lens 30.

$$0.25 fS < t2 < 0.35 fS \tag{4}$$

where
t2 is the thickness of lens 20.
Radius and other sizes in each example 1–5 in accordance with the above tables are as below (Table 6).

TABLE 6

| example | r1/r2 | T12/fS | T23/fS | t2/fS |
|---------|-------|--------|--------|-------|
| 1 | 0.97 | 0.34 | 0.40 | 0.30 |
| 2 | 0.96 | 0.34 | 0.41 | 0.28 |
| 3 | 1.00 | 0.35 | 0.42 | 0.30 |
| 4 | 0.98 | 0.35 | 0.41 | 0.30 |
| 5 | 0.97 | 0.33 | 0.40 | 0.30 |

MTF (Moduration Transfer Function) in each example 1–5 are shown in FIGS. 3–7, respectively. In FIGS. 3–7, a resolution on face glass 22 is 1 pl/mm, and also in the calculation for MTFs weights of spectrums produced from phosphors are considered as below (Table 7).

TABLE 7

| wave length | weight |
|---|---|
| 492 | 0.121 |
| 545 | 0.774 |
| 590 | 0.088 |
| 625 | 0.017 |

Figure 8:
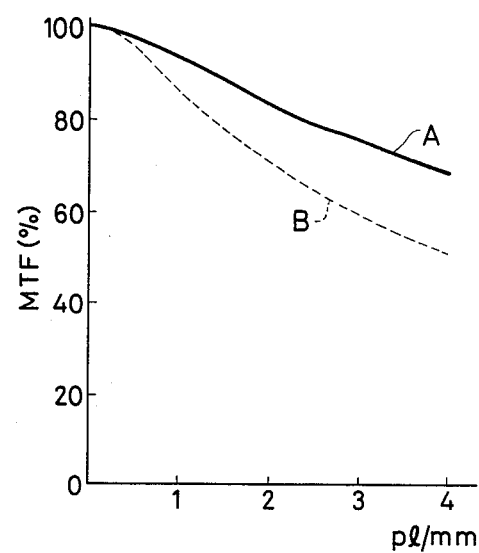
Figure 9:
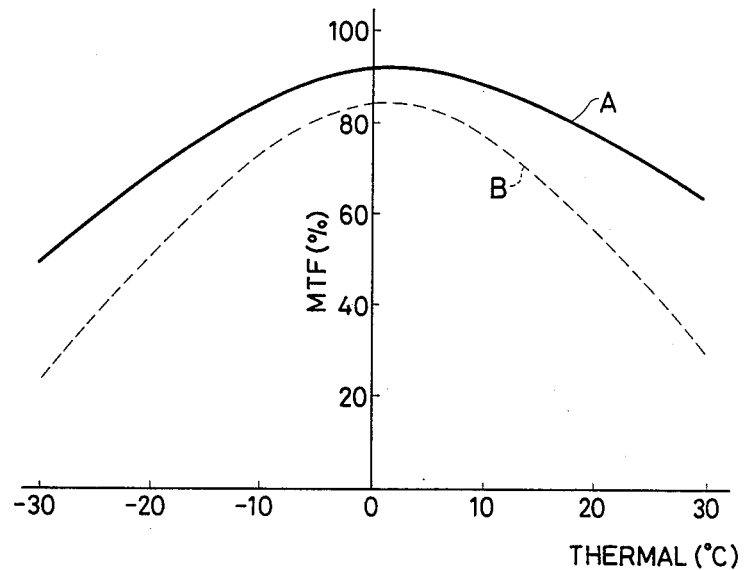

FIGS. 8 and 9 show the relationship between the resolution and MTF in the core portion, and the relationship between the thermal and MTF. In both FIGS. 8 and 9 A and B are characteristics of an example in accordance with this embodiment and the trial-manufactured example in accordance with U.S. Pat. No. 4,348,081.

In each example, though the lens system maintains high brightness (F number is 0.91), it shows good MTF characteristics as shown in FIGS. 3–9. The brightness ratio in the peripheral portion in the embodiment is 30% which is that in the prior system having a small picture angle. Therefore, the projection system in accordance with the embodiment is suitable for the compact set as shown in FIG. 10, with only one mirror being used in such set.

Figure 10:
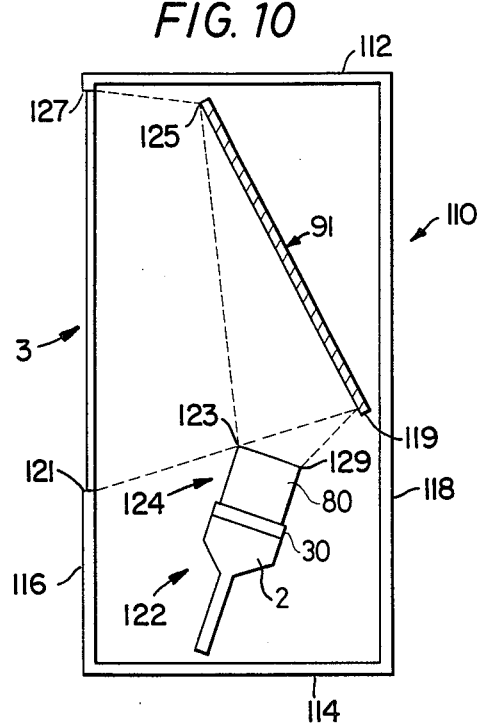
FIG. 10 shows a side view of a projection set in accordance with the embodiment of the invention.

The projection system of FIG. 10 is described as follows. The projection system has a cabinet 110 having a top side 112, a bottom side 114, a front side 116 and a rear side 118. A screen 3, also illustrated in FIG. 2, is fitted into the upper part of the front side. A mirror 91 is spaced from the screen and inclined to the screen with the lowest edge 119 of the mirror being positioned higher than the lowest edge 121 of the screen 3. The projection system 122 is comprised of a CRT 2, and a projection system 124 in accordance with FIG. 2. As is apparent from FIG. 10, the projection system 124 is mechanically coupled to the CRT 2 by a coupling mechanism. The image projected from the projection system 122 is enlarged upon imaging upon the mirror 91. Light from the upper edge 123 of the projection system 124 closest to the screen 3 falls upon the upper corner 125 of the mirror 91 and is reflected to the upper part 127 of the screen 3. Similarly, light from the upper corner 129 of the projection system 124 closest to the bottom edge 119 of the mirror 91 is reflected from the mirror 91 to the lower edge 121 of the screen 3.

If the CRT whose size is X inches is used for the present invention, the distance between surfaces may be multiplied by X/45 to the longitude values in Tables 1–5.

Figure 11:
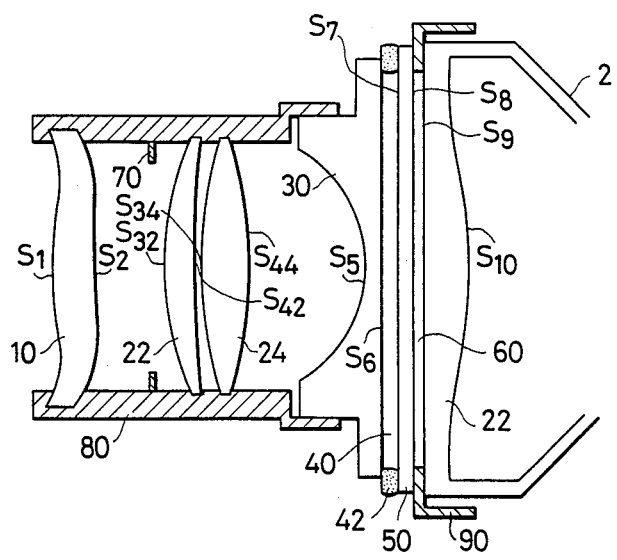
FIG. 11 shows a side view of another embodiment of the invention.

Lens 20 in FIG. 2 may be divided into two lenses 22 and 24 as shown in FIG. 11. In this embodiment, lens 22 is a convex meniscus lens of weak power. Lens 24 supplies the main share of the multiplication power, so it is desirable to use glass material to reduce the spherical aberration with the other lenses 10, 22 and 30 being plastic material.

Lens data of 6 typical examples for the embodiment shown in FIG. 11 are as follows in Tables 8–13.

TABLE 8

| | | spherical system | | |
|---|---|---|---|---|
| | | curvature radius | aperture radius | gap between surfaces | N |
| screen | | infinity | 650 | — | — |
| air | | — | — | 819 | 1.0 |
| lens 10 | S1 | 89.996 | 41 | — | — |
| | S2 | 625.255 | 40 | 12.822 | 1.4936 |
| air | | — | — | 19.214 | 1.0 |
| diaphragm | | infinity | 33 | — | — |
| air | | — | — | 0.2001 | 1.0 |
| lens 22 | S32 | 91.737 | 37 | — | — |
| | S42 | 340.758 | 37 | 9.0 | 1.51827 |
| air | | — | — | 1.5 | 1.0 |
| lens 24 | S34 | 125.409 | 36 | — | — |
| | S44 | −101.808 | 36 | 14.5 | 1.4936 |
| air | | — | — | 36.53 | 1.0 |
| lens 30 | S5 | −60.915 | 34.1 | — | — |
| | S6 | infinity | 65 | 1.97 | 1.4936 |
| layer 40 | S7 | infinity | 65 | 3.0 | 1.41 |
| glass 50 | S8 | infinity | 65 | 5.0 | 1.5403 |
| layer 60 | S9 | infinity | 65 | 5.0 | 1.41 |
| glass 22 | S10 | −119.63 | 65 | 12.5 | 1.5403 |

| | | aspheric coefficency | | | |
|---|---|---|---|---|---|
| | CC | AD | AE | AF | AG |
| S1 | −1.701 | −2.4403 *10−6 | −6.063 *10−10 | −7.8491 *10−13 | 4.0809 *10−16 |
| S2 | −100.0 | −2.2023 *10−6 | −6.9173 *10−10 | 2.8007 *10−14 | 1.3547 *10−16 |
| S34 | −50.0 | 2.0043 *10−6 | −1.2602 *10−10 | −4.6516 *10−13 | 4.4626 *10−16 |
| S44 | −3.639 | 1.1479 *10−7 | 2.4464 *10−10 | −3.6737 *10−13 | 3.0834 *10−16 |
| S5 | −0.06641 | −6.54 *10−6 | −4.3317 *10−11 | −1.4878 *10−12 | −5.5273 *10−17 |
| S10 | −3.0554 | 8.4036 *10−7 | 8.036 *10−11 | −6.4008 *10−14 | 6.4367 *10−18 |

TABLE 9

| | | spherical system | | |
|---|---|---|---|---|
| | | curvature radius | aperture radius | gap between surfaces | N |
| screen | | infinity | 650 | — | — |
| air | | — | — | 819 | 1.0 |
| lens 10 | S1 | 86.377 | 41 | — | — |
| | S2 | 698.495 | 40 | 13.95 | 1.4936 |
| air | | — | — | 19.413 | 1.0 |
| diaphragm | | infinity | 33 | — | — |
| air | | — | — | 0.2001 | 1.0 |
| lens 22 | S32 | 91.171 | 37 | — | — |
| | S42 | 281.005 | 37 | 9.0 | 1.51827 |
| air | | — | — | 0.5 | 1.0 |
| lens 24 | S34 | 136.928 | 36 | — | — |
| | S44 | −99.053 | 36 | 14.5 | 1.4936 |
| air | | — | — | 36.263 | 1.0 |
| lens 30 | S5 | −60.0 | 34.1 | — | — |
| | S6 | infinity | 65 | 1.97 | 1.4936 |
| layer 40 | S7 | infinity | 65 | 3.0 | 1.41 |
| glass 50 | S8 | infinity | 65 | 5.0 | 1.5403 |
| layer 60 | S9 | infinity | 65 | 5.0 | 1.41 |
| glass 22 | S10 | −119.63 | 65 | 12.5 | 1.5403 |

| | | aspheric coefficency | | | |
|---|---|---|---|---|---|
| | CC | AD | AE | AF | AG |
| S1 | −1.701 | −2.0361 *10−6 | −4.4947 *10−10 | −7.423 *10−13 | 3.5420 *10−16 |
| S2 | −100.0 | −1.7389 *10−6 | −5.8208 *10−10 | −3.8311 *10−15 | 1.3151 *10−16 |
| S34 | −45.236 | 1.6762 *10−6 | 2.3818 *10−11 | −3.2893 *10−13 | 3.4702 *10−16 |
| S44 | −6.382 | −2.457 | 3.5928 | −3.1421 | 2.6819 |

TABLE 9-continued

| | | | | | |
|---|---|---|---|---|---|
| | | $*10^{-7}$ | $*10^{-10}$ | $*10^{-13}$ | $*10^{-16}$ |
| S5 | −0.08217 | −6.2769 | −4.1562 | −9.7193 | −3.133 |
| | | $*10^{-6}$ | $*10^{-10}$ | $*10^{-13}$ | $*10^{-16}$ |
| S10 | −3.0554 | 8.4036 | 8.036 | −6.4008 | 6.4367 |
| | | $*10^{-7}$ | $*10^{-11}$ | $*10^{-14}$ | $*10^{-18}$ |

TABLE 10 spherical system

| | | curvature radius | aperture radius | gap between surfaces | N |
|---|---|---|---|---|---|
| screen | | infinity | 650 | — | — |
| air | | — | — | 819 | 1.0 |
| | S1 | 75.303 | 41 | — | — |
| lens 10 | | | | 15.443 | 1.4936 |
| | S2 | 649.802 | 40 | — | — |
| air | | | | 19.729 | 1.0 |
| diaphragm | | infinity | 33 | — | — |
| air | | — | — | 0.2001 | 1.0 |
| | S32 | 87.166 | 37 | — | — |
| lens 22 | | | | 9.0 | 1.51827 |
| | S42 | 286.017 | 37 | — | — |
| air | | — | — | 2.5 | 1.0 |
| | S34 | 133.850 | 36 | — | — |
| lens 24 | | | | 14.5 | 1.4936 |
| | S44 | −109.235 | 36 | — | — |
| air | | — | — | 31.61 | 1.0 |
| | S5 | −57.512 | 34.1 | — | — |
| lens 30 | | | | 1.97 | 1.4936 |
| | S6 | infinity | 65 | — | — |
| layer 40 | | | | 3.0 | 1.41 |
| | S7 | infinity | 65 | — | — |
| glass 50 | | | | 5.0 | 1.5403 |
| | S8 | infinity | 65 | — | — |
| layer 60 | | | | 5.0 | 1.41 |
| | S9 | infinity | 65 | — | — |
| glass 22 | | | | 12.5 | 1.5403 |
| | S10 | −119.63 | 65 | — | — | aspheric coefficency

| | CC | AD | AE | AF | AG |
|---|---|---|---|---|---|
| S1 | −1.701 | −1.4810 $*10^{-6}$ | −3.326 $*10^{-10}$ | −7.6072 $*10^{-13}$ | 2.4036 $*10^{-16}$ |
| S2 | −100.0 | −1.4840 $*10^{-6}$ | −6.013 $*10^{-10}$ | −7.1801 $*10^{-14}$ | 8.0110 $*10^{-17}$ |
| S34 | −39.1825 | 1.4414 $*10^{-6}$ | 1.9887 $*10^{-10}$ | −1.7072 $*10^{-13}$ | 2.7198 $*10^{-16}$ |
| S44 | −5.7556 | −1.4915 $*10^{-7}$ | 5.4784 $*10^{-10}$ | −2.8820 $*10^{-13}$ | 2.0724 $*10^{-16}$ |
| S5 | −0.2047 | −5.8814 $*10^{-6}$ | −8.5215 $*10^{-10}$ | −7.0166 $*10^{-13}$ | −3.1001 $*10^{-16}$ |
| S10 | −3.0554 | 8.4036 $*10^{-7}$ | 8.036 $*10^{-11}$ | −6.4008 $*10^{-14}$ | 6.4367 $*10^{-18}$ |

TABLE 11 spherical system

| | | curvature radius | aperture radius | gap between surfaces | N |
|---|---|---|---|---|---|
| screen | | infinity | 650 | — | — |
| air | | — | — | 819 | 1.0 |
| | S1 | 87.637 | 41 | — | — |
| lens 10 | | | | 12.39 | 1.4936 |
| | S2 | 435.438 | 40 | — | — |
| air | | | | 18.448 | 1.0 |
| diaphragm | | infinity | 33 | — | — |
| air | | — | — | 0.2001 | 1.0 |
| | S32 | 88.969 | 37 | — | — |
| lens 22 | | | | 9.0 | 1.51827 |
| | S42 | 330.814 | 37 | — | — |
| air | | — | — | 2.5 | 1.0 |
| | S34 | 124.525 | 36 | — | — |
| lens 24 | | | | 14.5 | 1.4936 |
| | S44 | −101.820 | 36 | — | — |
| air | | — | — | 36.50 | 1.0 |
| | S5 | −61.550 | 34.1 | — | — |
| lens 30 | | | | 1.97 | 1.4936 |
| | S6 | infinity | 65 | — | — |
| layer 40 | | | | 3.0 | 1.41 |
| | S7 | infinity | 65 | — | — |
| glass 50 | | | | 5.0 | 1.5403 |
| | S8 | infinity | 65 | — | — |
| layer 60 | | | | 5.0 | 1.41 |
| | S9 | infinity | 65 | — | — |
| glass 22 | | | | 12.5 | 1.5403 |
| | S10 | −119.63 | 65 | — | — | aspheric coefficency

| | CC | AD | AE | AF | AG |
|---|---|---|---|---|---|
| S1 | −1.701 | −2.4577 $*10^{-6}$ | −6.9851 $*10^{-10}$ | −8.1041 $*10^{-13}$ | 4.3027 $*10^{-16}$ |
| S2 | −100.0 | −2.2519 $*10^{-6}$ | −7.6515 $*10^{-10}$ | 1.2566 $*10^{-14}$ | 1.5082 $*10^{-16}$ |
| S34 | −50.0 | 1.8588 $*10^{-6}$ | −1.2544 $*10^{-10}$ | −4.3664 $*10^{-13}$ | 4.1362 $*10^{-16}$ |
| S44 | −3.639 | 2.4502 $*10^{-8}$ | 2.8046 $*10^{-10}$ | −3.6344 $*10^{-13}$ | 2.8625 $*10^{-16}$ |
| S5 | −0.09955 | −6.5347 $*10^{-6}$ | 1.8582 $*10^{-10}$ | −1.7284 $*10^{-12}$ | 8.5182 $*10^{-17}$ |
| S10 | −3.0554 | 8.4036 $*10^{-7}$ | 8.036 $*10^{-11}$ | −6.4008 $*10^{-14}$ | 6.4367 $*10^{-18}$ |

TABLE 12 spherical system

| | | curvature radius | aperture radius | gap between surfaces | N |
|---|---|---|---|---|---|
| screen | | infinity | 650 | — | — |
| air | | — | — | 819 | 1.0 |
| | S1 | 80.323 | 41 | — | — |
| lens 10 | | | | 14.586 | 1.4936 |
| | S2 | 1240.295 | 40 | — | — |
| air | | | | 21.275 | 1.0 |
| diaphragm | | infinity | 33 | — | — |
| air | | — | — | 0.2001 | 1.0 |
| | S32 | 87.305 | 37 | — | — |
| lens 22 | | | | 9.0 | 1.51827 |
| | S42 | 296.647 | 37 | — | — |
| air | | — | — | 0.5 | 1.0 |
| | S34 | 133.784 | 36 | — | — |
| lens 24 | | | | 14.5 | 1.4936 |
| | S44 | −103.660 | 36 | — | — |
| air | | — | — | 32.784 | 1.0 |
| | S5 | −54.849 | 34.1 | — | — |
| lens 30 | | | | 1.97 | 1.4936 |
| | S6 | infinity | 65 | — | — |
| layer 40 | | | | 3.0 | 1.41 |
| | S7 | infinity | 65 | — | — |
| glass 50 | | | | 5.0 | 1.5403 |
| | S8 | infinity | 65 | — | — |
| layer 60 | | | | 5.0 | 1.41 |
| | S9 | infinity | 65 | — | — |
| glass 22 | | | | 12.5 | 1.5403 |
| | S10 | −119.63 | 65 | — | — | aspheric coefficency

| | CC | AD | AE | AF | AG |
|---|---|---|---|---|---|
| S1 | −1.701 | −1.6765 $*10^{-6}$ | −3.8848 $*10^{-10}$ | −7.7833 $*10^{-13}$ | 2.7370 $*10^{-16}$ |
| S2 | −100.0 | −1.5340 $*10^{-6}$ | −5.8971 $*10^{-10}$ | −6.6846 $*10^{-14}$ | 7.7986 $*10^{-17}$ |
| S32 | 0 | 2.3104 $*10^{-7}$ | −1.8291 $*10^{-10}$ | −1.0619 $*10^{-13}$ | −8.2655 $*10^{-18}$ |
| S42 | 0 | 1.2941 $*10^{-8}$ | 1.3888 $*10^{-10}$ | 7.4729 $*10^{-14}$ | 6.2246 $*10^{-17}$ |
| S34 | −43.768 | 1.4358 $*10^{-6}$ | 2.4884 $*10^{-10}$ | −4.9221 $*10^{-14}$ | 3.2732 $*10^{-16}$ |
| S44 | −5.78 | −2.8575 $*10^{-7}$ | 2.4323 $*10^{-10}$ | −4.0107 $*10^{-13}$ | 2.9530 $*10^{-16}$ |
| S5 | 0.3325 | −6.0710 $*10^{-6}$ | −1.4308 $*10^{-9}$ | 6.5297 $*10^{-13}$ | −1.4180 $*10^{-15}$ |
| S10 | −3.0554 | 8.4036 $*10^{-7}$ | 8.036 $*10^{-11}$ | −6.4008 $*10^{-14}$ | 6.4367 $*10^{-18}$ |

TABLE 13 spherical system

TABLE 13-continued

| | | curvature radius | aperture radius | gap between surfaces | N |
|---|---|---|---|---|---|
| screen | | infinity | 650 | — | — |
| air | | — | — | 819 | 1.0 |
| | S1 | 77.217 | 41 | — | — |
| lens 10 | | | | 13.9 | 1.4936 |
| | S2 | 938.306 | 40 | — | — |
| air | | — | — | 21.005 | 1.0 |
| diaphragm | | infinity | 33 | — | — |
| air | | — | — | 0.2001 | 1.0 |
| | S32 | 86.419 | 37 | — | — |
| lens 22 | | | | 9.0 | 1.51827 |
| | S42 | 295.427 | 37 | — | — |
| air | | — | — | 2.5 | 1.0 |
| | S34 | 135.948 | 36 | — | — |
| lens 24 | | | | 14.5 | 1.4936 |
| | S44 | −101.165 | 36 | — | — |
| air | | — | — | 31.409 | 1.0 |
| | S5 | −53.543 | 34.1 | — | — |
| lens 30 | | | | 1.97 | 1.4936 |
| | S6 | infinity | 65 | — | — |
| layer 40 | | | | 3.0 | 1.41 |
| | S7 | infinity | 65 | — | — |
| glass 50 | | | | 5.0 | 1.5403 |
| | S8 | infinity | 65 | — | — |
| layer 60 | | | | 5.0 | 1.41 |
| | S9 | infinity | 65 | — | — |
| glass 22 | | | | 12.5 | 1.5403 |
| | S10 | −119.63 | 65 | — | — |

| | aspheric coefficency | | | |
|---|---|---|---|---|
| | CC | AD | AE | AF | AG |
| S1 | −1.701 | −1.575 *10$^{-6}$ | −3.5193 *10$^{-10}$ | −7.6582 *10$^{-13}$ | 2.3774 *10$^{-16}$ |
| S2 | −100.0 | −1.4628 *10$^{-6}$ | −5.8494 *10$^{-10}$ | −8.376 *10$^{-14}$ | 6.1969 *10$^{-17}$ |
| S32 | 0 | 1.3813 *10$^{-8}$ | −2.7809 *10$^{-11}$ | −2.0981 *10$^{-14}$ | −4.9640 *10$^{-17}$ |
| S42 | 0 | −8.9179 *10$^{-9}$ | 4.5558 *10$^{-11}$ | 6.7091 *10$^{-14}$ | 1.1941 *10$^{-16}$ |
| S34 | −44.614 | 1.2744 *10$^{-6}$ | 2.0933 *10$^{-10}$ | −8.7601 *10$^{-14}$ | 1.1941 *10$^{-16}$ |
| S44 | −3.273 | −3.3531 *10$^{-7}$ | 4.0710 *10$^{-10}$ | 3.65 *10$^{-13}$ | 1.7595 *10$^{-16}$ |
| S5 | −0.0634 | −6.435 *10$^{-6}$ | −8.9558 *10$^{-10}$ | 2.804 *10$^{-13}$ | −8.6953 *10$^{-16}$ |
| S10 | −3.0554 | 8.4036 *10$^{-7}$ | 8.036 *10$^{-11}$ | −6.4008 *10$^{-14}$ | 6.4367 *10$^{-18}$ |

The following conditions are obtained from Tables 8-13 in the case of 10 times enlarging by using a 4.5 inch CRT and a 45 inch screen.

(1) Relating to surface S1, the relationship between spheric value Ps and aspheric value Pa is as below:

$$0.5Ps < Pa < 1.5Ps$$

where $$Ps = \frac{rm^2/RD}{1 + \sqrt{1 - rm^2/RD^2}}$$

Pa=Ps−zm and where
rm and zm are the radius from the lens axis and the deviation in lens axis of the outermost effective portion of surface S1. Ps, Pa and Ps/Pa are shown as below (Table 14).

TABLE 14

| | spheric value Ps | aspheric value Pa | Ps/Pa |
|---|---|---|---|
| example 6 | 9.89 | 11.43 | 1.2 |
| example 7 | 10.35 | 10.04 | 0.97 |
| example 8 | 12.14 | 10.02 | 0.83 |
| example 9 | 10.18 | 11.89 | 1.17 |

TABLE 14-continued

| | spheric value Ps | aspheric value Pa | Ps/Pa |
|---|---|---|---|
| example 10 | 11.25 | 10.35 | 0.92 |
| example 11 | 11.78 | 10.50 | 0.89 |

(2) $0 < T2 < 0.04$ fS where T2 is the distance between surface S34 and surface S42. MTF characteristics in each example 6-11 have a tendency similar to that as shown in FIGS. 3-9.

What is claimed is:

1. A system for projecting an optical image along an optical axis on a screen, comprising:
   (a) a first lens means having a lens core portion containing the optical axis which causes convergence of the image and a peripheral portion with a lens edge which causes divergence of the image;
   (b) a second lens means containing the optical axis and having a convex lens surface;
   (c) a third lens means containing the optical axis and having a concave lens surface; and
   (d) a CRT having a face glass with an inner surface which is coated with a phosphor and being curved to form a fourth lens means having a curvature center within a core portion including the lens axis of the fourth lens means that is disposed on the screen side of the projection system, a radius of curvature of part of the core portion of the fourth lens means being non constant for reducing field curvature.

2. A system in accordance with claim 1, further comprising a diaphragm disposed between the first lens means and the second lens means.

3. A system in accordance with claim 2, wherein the first, second and third lens means are made from plastic material.

4. A system in accordance with claim 1, wherein the curvature radius of part of the fourth lens means increases in accordance with increments of the semi-aperture distance of each part from the lens axis.

5. A system for projecting an optical image along an optical axis on a screen comprising:
   (a) a first lens means having a lens core portion containing the optical axis which causes convergence of the image and a peripheral portion with a lens edge which causes divergence of the image;
   (b) a second lens means containing the optical axis and having a positive meniscus lens element with a convex surface toward the screen surface;
   (c) a third lens means containing the optical axis and having a lens element with convex surfaces;
   (d) a fourth lens means containing the optical axis and having a lens element with a concave surface; and
   (e) a CRT having a face glass with an inner surface which is coated with a phosphor and being curved to form a fifth lens means having a curvature center within a core portion including the lens axis of the fourth lens means that is disposed on the screen side of the projection system, the curvature radius of part of the core portion of the fifth lens means being non constant for reducing field curvature.

6. A system in accordance with claim 5, further comprising a diaphragm disposed between the first lens means and the second lens means.

7. A system in accordance with claim 6, wherein the first, second and third lens means are made from plastic material and the fourth lens means is made from glass material.

8. A system in accordance with claim 5, wherein the curvature radius of part of the fifth lens means increases in accordance with increments of the semi-aperture distance of each part from the lens axis.

9. A system for projecting an optical image along an optical axis on a screen comprising:
   (a) a first lens means having a lens core portion containing the optical axis which causes convergence of the image and a peripheral portion with a lens edge which causes divergence of the image;
   (b) a second lens means containing the optical axis and having a convex lens surface;
   (c) a third lens means containing the optical axis and having a concave lens surface; and
   (d) a CRT having a face glass with an inner surface coated with a phosphor and being curved to form a fourth lens means with a core portion having a curvature center facing the screen, the curved surface being defined from the optical axis by a series of circles of changing radius with the curvature radius of points along each circle being the same and the curvature radius of points on each different circle being a function of the radius of each circle for reducing field curvature.

10. A system in accordance with claim 9, wherein the function increases with radius.

11. A system in accordance with claim 10, further comprising diaphragm means disposed between the first lens means and the second lens means.

12. A system in accordance with claim 11, wherein the first, second and third lens means are made from a plastic material.

13. A system in accordance with claim 9, wherein the curved surface has a series of circles of increasing radius.

14. A system for projecting an optical image along an optical axis on a screen comprising:
   (a) a first lens means having a lens core portion containing the optical axis which causes convergence of the image and a peripheral portion with a lens edge which causes divergence of the image;
   (b) a second lens means containing the optical axis and having a positive meniscus lens element with a convex surface toward the screen surface;
   (c) a third lens means containing the optical axis and having a lens element with convex surfaces;
   (d) a fourth lens means containing the optical axis and having a lens element with a concave surface; and
   (e) a CRT having a face glass with an inner surface which is coated with a phosphor and being curved to form a fifth lens means with a core portion having a curvature facing the screen, the curved surface being defined from the optical axis by a series of circles of changing radius with the curvature radius of points on each different circle being the same and the curvature radius of points on each different circle being a function of the radius of each circle for reducing field curvature.

15. A system in accordance with claim 14, wherein the function increases with radius.

16. A system in accordance with claim 15, further comprising diaphragm means disposed between the first lens means and the second lens means.

17. A system in accordance with claim 16, wherein the first, second and third lens means are made from plastic material and the fourth lens means is made from glass material.

18. A system in accordance with claim 14, wherein the curved surface has a series of circles of increasing radius.

19. A projection television system comprising:
   a cathode ray tube having a neck portion and a face glass with an internal surface on which phosphor elements are mounted, said internal surface being aspheric and convex to said neck portion to reduce field curvature; and
   optical means for projecting an image produced on said face glass onto a projection screen.

20. The system of claim 19 wherein said optical means for projecting an image comprises from said projection screen side:
   a first aspheric lens providing a first power of magnification;
   a second biconvex lens for providing a power of magnification which is a major portion of enlargement provided by said optical means for projecting an image; and
   a third aspheric lens with a concave face on its screen side providing a negative power of magnification.

21. The system of claim 20 wherein:

$$0.9\, r1 < r2 < 1.1\, r1$$

with r1 and r2 being curvature radii of core portions of the screen side surface of said first and second lenses, respectively, with said core portions being spherical.

22. The system of claim 20 wherein:

$$0.2fS < T12 < 0.4fS$$

with T12 being the distance between said first and second lenses, and fS being a focal length of said optical means for projecting an image.

23. The system of claim 20 wherein:

$$0.25fS < t2 < 0.35fS$$

with t2 being the thickness of said second lens along the optical axis, and fS being a focal length of said optical means for projecting an image.

24. The system of claim 19 wherein said optical means for projecting an image comprises from said projection screen side:
   a first aspheric lens providing a power of magnification;
   a second positive meniscus lens providing a positive power of magnification;
   a third biconvex lens providing a power of magnification which is a major portion of enlargement provided by said optical means for projecting an image; and
   a fourth aspheric lens with a concave face on its screen side providing a negative power of magnification.

25. The system of claim 19 wherein said optical means for projecting an image comprises from said projection screen side:
   a first plastic lens providing a power of magnification and having a pair of aspheric surfaces;
   a second glass lens providing a power of positive magnification and having a pair of spheric surfaces;

a third plastic lens providing power of positive magnification and having a pair of aspheric surfaces; and a fourth plastic lens providing a negative power of magnification and having an aspheric surface on a screen side.

26. The system of claim 25 wherein:

$0.5\ Ps < Pa < 1.5\ Ps$ with $Ps =$ $$\frac{rm^2/RD}{1 + \sqrt{1 - rm^2/RD^2}} \text{ and } Pa = Ps - zm \text{ and}$$

with rm being the radius from an axis of said first lens, zm being a deviation in the axis of said first lens of an outermost effective portion of a screen side surface of said first lens, and RD is a curvature radius of said first lens.

27. The lens system of claim 25 wherein:

$0 < T2 < 0.04 fS$ with T2 being the distance along a lens axis between a CRT side surface of said second lens and a screen side surface of said third lens, and fS is a focal length of said optical means for projecting an image.

28. The system of claim 19 wherein said internal surface of said face glass has a surface sag of approximately 5 mm at a peripheral point of said internal surface of said face glass.

29. The system of claim 20 wherein said internal surface of said face glass has a surface sag of approximately 5 mm at a peripheral point of said internal surface of said face glass.

30. The system of claim 25 wherein said internal surface of said face glass has a surface sag of approximately 5 mm at a peripheral point of said internal surface of said face glass.

31. An optical system for enlarging an image produced on a face glass of a cathode ray tube and projecting the image onto a screen, comprising from a screen side:

a first aspheric lens providing a power of magnification;

a second biconvex lens providing a power of magnification which is a major portion of enlargement provided by said optical means for projecting an image; and a third aspheric lens with a concave face on a screen side providing a negative power of magnification;

wherein a surface of said face glass on which phosphor elements are mounted is convex to a neck portion of said cathode ray tube to reduce field curvature; and wherein $0.2 fS < T12 < 0.4 fS$ with T12 being a distance between said first and second lenses, and fS being the focal length of said optical system.

32. An optical system for enlarging an image produced on a face glass of a cathode ray tube and projecting the image onto a screen, comprising from a screen side:

a first lens of providing a power of magnification and having a pair of aspheric surfaces;

a second lens providing a positive power of magnification and having a pair of spheric surfaces;

a third lens having a pair of aspheric surfaces; and a fourth lens providing a negative power of magnification and having an aspheric surface at a screen side;

wherein a surface of said face glass on which phosphor elements are mounted is convex to a neck portion of said cathode ray tube to reduce field curvature; and wherein $0.5\ Ps < Pa < 1.5\ Ps$ with $Ps =$ $$\frac{rm^2/RD}{1 + \sqrt{1 - rm^2/RD^2}} \text{ and } Pa = Ps - zm \text{ and}$$

with rm being a radius from an axis of said first lens, zm being a deviation in the axis of said first lens of the outermost effective portion of a screen side surface of said first lens, and RD is a curvature radius of said first lens.

33. A projection display apparatus comprising:

a cabinet having a top side, a bottom side, a front side and a rear side;

a screen fitted in an upper part of said front side;

a CRT having a face glass on which an image to be projected to said screen is reproduced and upwardly facing a corner defined by said top and rear sides and said CRT is mounted in said cabinet;

an optical unit mounted on said CRT over said face glass of said CRT for optically enlarging said image, upper and lower rays of light passing through an upper edge of the optical unit nearest said screen and nearest said rear side of said optical unit being transmitted respectively to upper and lower edges of said screen; and a mirror inserted between said screen and said optical unit for reflecting light transmitted through said optical unit from said CRT to said screen; and wherein said screen, said mirror and said optical unit are arranged so that said upper edge nearest said screen of said optical unit is located at a position adjacent a light path through which light reflected by a lower edge of said mirror passes.

34. An apparatus in accordance with claim 33, wherein:

said upper edge nearest said screen of said optical unit is beneath said light path through which light reflected by a lower edge of said mirror passes and is above a horizontal line intersecting said lower edge of said screen.

35. An apparatus in accordance with claim 33, wherein:

said optical unit includes coupling means connecting mechanically said optical unit to said face glass of said CRT.

36. An apparatus in accordance with claim 35, wherein:

said optical unit further includes from said face glass side, a concave aspheric lens, a biconvex lens and a plastic lens having a pair of aspheric surfaces.

37. An apparatus in accordance with claim 36, wherein:

$0.5 ps < pa < 1.5 ps$ with $ps = \dfrac{rm^2/RD}{1 + \sqrt{1 - rm^2/RD}}$ and $pa = ps - zm$ with rm being a radius from an axis of said plastic lens, zm is the deviation in the axis of said plastic lens of an outermost effective portion of a mirror side surface of said plastic lens, and RD being a curvature radius of said plastic lens.

38. An apparatus in accordance with claim 35, wherein:
said optical unit further includes from said face glass side, a lens with a concave surface, a plastic lens having a pair of aspheric surfaces, a lens having a convex surface and another plastic lens having a pair of aspheric surfaces.

39. An apparatus in accordance with claim 38, wherein:

$0.2fs < T12 < 0.4fs$ with T12 being the distance between said another plastic lens and said lens having a convex surface, and fs being a focal length of said optical unit 40. A projection display apparatus comprising:
a cabinet having a top side, a bottom side, a front side and a rear side;
a screen fitted in an upper part of said front side;
a mirror spaced from and inclined with respect to said screen, a lowest edge of said mirror being positioned higher than a lowest edge of said screen;
a CRT having a face glass on which an image to be projected is reproduced and upwardly facing said mirror, and said CRT is mounted in said cabinet; and
an optical unit mounted on said CRT over said face glass of said CRT to project said image onto said screen through a reflection at said mirror, and an upper part of said optical unit being positioned between said lowest edges of said mirror and screen.

41. A projection display apparatus comprising:
a cabinet having a top side, a bottom side, a front side and a rear side;
a screen fitted in an upper part of said front side;
a mirror spaced and inclined to said screen, the lowest edge of said mirror being positioned higher than the lowest edge of said screen;
a CRT having a face glass on which an image to be projected is reproduced and upwardly facing said mirror, and said CRT is mounted in said cabinet; and
an optical unit mounted on said CRT over said face glass of said CRT to project said image onto said screen through a reflection at said mirror, an upper part of said optical unit being positioned above said lowest edge of said screen.

42. An optical system for enlarging an image produced on a face glass of a cathode ray tube and projecting the image onto a screen, comprising from a screen side:
a first aspheric lens providing a power of magnification;
a second biconvex lens providing a power of magnification which is a major portion of enlargement provided by said optical system for projecting an image; and
a third aspheric lens with a concave face on a screen side providing a negative power of magnification; and wherein $0.2fS < T12 < 0.4fs$ with T12 being a distance between said first and second lenses, and fs being the focal length of said optical system.

* * * * *